United States Patent
Rivera et al.

(10) Patent No.: US 10,685,325 B2
(45) Date of Patent: Jun. 16, 2020

(54) ITEM RETURN TRACKING SYSTEMS AND METHODS

(71) Applicant: AMERICAN TRAFFIC SOLUTIONS, INC., Mesa, AZ (US)

(72) Inventors: Jason A. Rivera, Chandler, AZ (US); Jason A. Fox, Chandler, AZ (US)

(73) Assignee: AMERICAN TRAFFIC SOLUTIONS, INC., Mesa, AZ (US)

(*) Notice: Subject to any disclaimer, the term of this patent is extended or adjusted under 35 U.S.C. 154(b) by 100 days.

(21) Appl. No.: 16/001,442

(22) Filed: Jun. 6, 2018

(65) Prior Publication Data

US 2018/0349838 A1 Dec. 6, 2018

Related U.S. Application Data

(60) Provisional application No. 62/515,980, filed on Jun. 6, 2017.

(51) Int. Cl.
*G06Q 30/00* (2012.01)
*G06Q 10/08* (2012.01)
*G06K 7/10* (2006.01)

(52) U.S. Cl.
CPC ....... *G06Q 10/087* (2013.01); *G06K 7/10128* (2013.01); *G06K 7/10297* (2013.01)

(58) Field of Classification Search
CPC ....... G06Q 10/087; G06Q 10/08; G06Q 10/06
USPC ............................................... 235/385
See application file for complete search history.

(56) References Cited

U.S. PATENT DOCUMENTS

| | | | |
|---|---|---|---|
| 7,295,120 B2 | 11/2007 | Waldner et al. | |
| 7,557,709 B2* | 7/2009 | Flores | G06Q 10/087 |
| | | | 340/572.1 |
| 7,932,824 B2* | 4/2011 | Flores | G07F 9/026 |
| | | | 340/572.1 |
| 8,102,265 B1 | 1/2012 | Billman | |
| 9,292,986 B1 | 3/2016 | Woodward et al. | |
| 9,378,484 B1 | 6/2016 | Russell et al. | |
| 9,663,294 B2 | 5/2017 | Young et al. | |
| 9,670,694 B2* | 6/2017 | Larson | G07C 9/00309 |
| 2005/0289032 A1 | 12/2005 | Hoblit et al. | |
| 2006/0085297 A1 | 4/2006 | Minerley | |
| 2009/0167502 A1 | 7/2009 | Erickson et al. | |
| 2010/0127871 A1 | 5/2010 | Pontin | |
| 2011/0199212 A1* | 8/2011 | Matityaho | G07G 1/0045 |
| | | | 340/572.7 |
| 2012/0092134 A1 | 4/2012 | Stern et al. | |
| 2012/0161944 A1 | 6/2012 | Horng-Ji | |

(Continued)

FOREIGN PATENT DOCUMENTS

KP   1020090000074 A   1/2009

OTHER PUBLICATIONS

PCT/US2018/036258, International Search Report and Written Opinion, dated Sep. 21, 2018, 16 pages.

*Primary Examiner* — Ahshik Kim
(74) *Attorney, Agent, or Firm* — Stoel Rives LLP

(57) ABSTRACT

A system for tracking returned items may include a return recognition device, a storage compartment, and a set of tags. The tags may be coupled with items to be returned. When the items are placed within the storage compartment, the return recognition device may read the tag to collect information about the returned item. The system may send a signal with a timestamp indicating that the item has been successfully returned.

17 Claims, 8 Drawing Sheets

(56) References Cited

U.S. PATENT DOCUMENTS

2014/0337040 A1 11/2014 Debusk et al.
2015/0127142 A1 5/2015 Young et al.
2016/0162715 A1 6/2016 Luk et al.

* cited by examiner

ITEM RETURN TRACKING SYSTEMS AND METHODS

TECHNICAL FIELD

The present disclosure relates to systems for tracking returned items. Specifically, the present disclosure relates to systems that may recognize when a particular item has been returned and transmit notification of the event.

BRIEF DESCRIPTION OF THE DRAWINGS

The written disclosure herein describes illustrative embodiments that are non-limiting and non-exhaustive. Reference is made to certain of such illustrative embodiments that are depicted in the figures described below.

DETAILED DESCRIPTION

Figure 1:
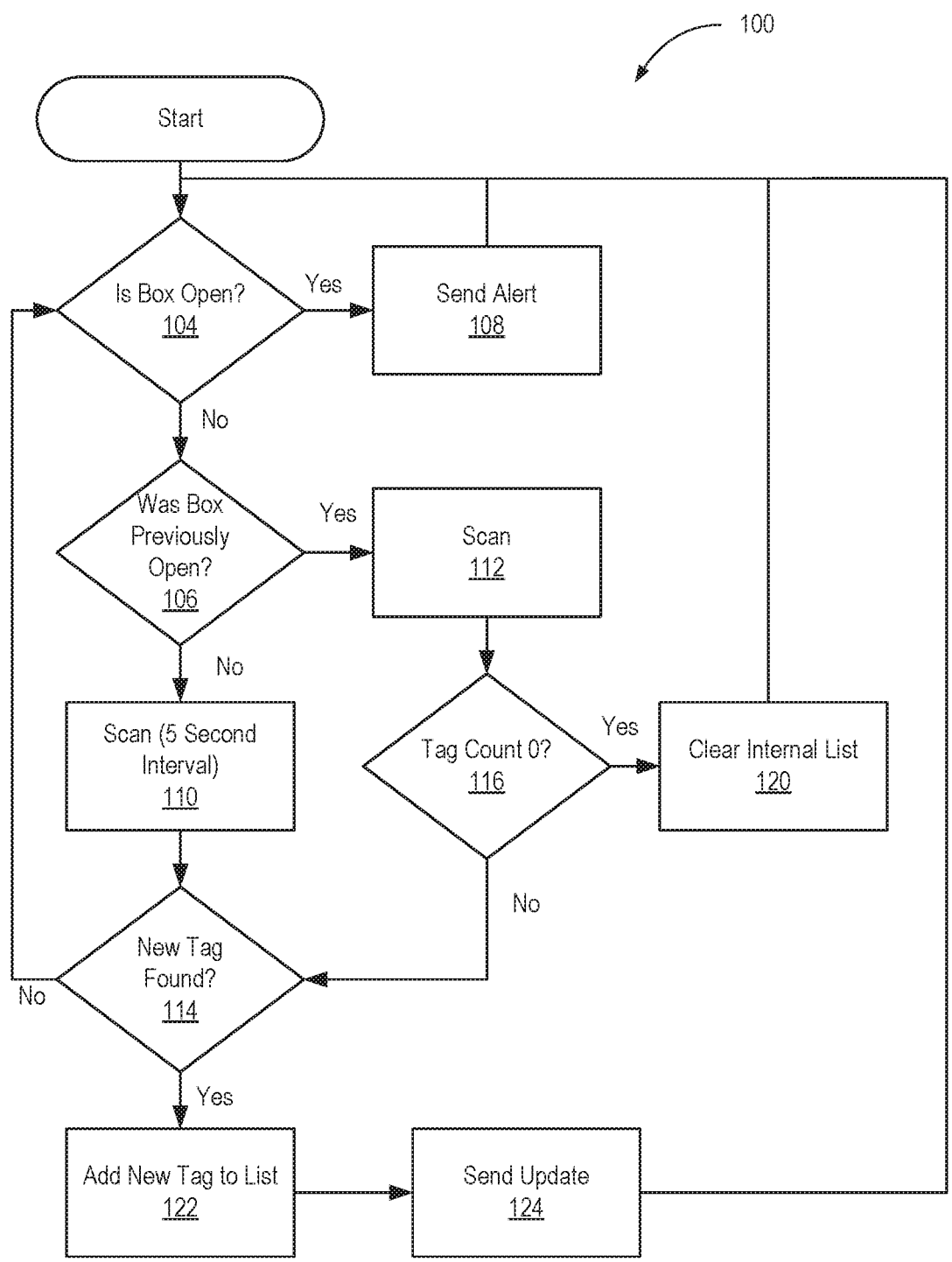
FIG. 1 is a flow chart of a method for processing returned items using an item return tracking system, according to a first embodiment.

This disclosure describes systems and methods for sensing and processing returned items. In one embodiment, an item return tracking system may be configured to receive returned items, read or recognize the item being returned, store returned items, maintain a list of recently returned items, generate notifications relating to returned items, and transmit notifications to interested persons.

For example, a rental car company may utilize the item return tracking system to track the after-hours return of rental car keys. In one embodiment, a radio-frequency identification (RFID) sticker or key-fob may be coupled to the rental car key such that, when the key is placed within a key drop box (i.e., a compartment for item retainment) of the item return tracking system, a return recognition device may read the RFID sticker or key-fob coupled to the rental car key, add the RFID to a running list of returned RFIDs, generate a notification of the returned keys, and transmit the notification to the rental car company's office.

In some embodiments, when RFID tagged keys are placed in the key drop box (i.e., a compartment for item retainment), a Multi-Tag RFID reader within the key drop box may read or scan to detect a new RFID tagged key. A transmitter may transmit a notification to the rental car company's office and back to the customer indicating the key has been received. In some embodiments, the return recognition device may continuously or periodically scan for new keys. In addition, in some embodiments, when someone opens the box to return a key, the Multi-Tag RFID reader may scan for tags. Opening the box may trigger an alert notifying the rental car company's office that the box was opened. After the box is closed the return recognition device may rescan the contents of the box. If no keys are found, the system may clear an internal list of known keys with the assumption that an employee has emptied the key drop box. LEDs and/or an LCD display may be used to display current box status. For example, at least one LED may be configured to emit green light thereby alerting employees that the box is devoid of contents.

In some embodiments, the tracking system may be configured to sense or read a single item recently placed within the compartment for item retention. For example, a Single-Tag RFID reader within the key drop box may read or scan to detect a new RFID tagged key recently placed within the key drop box. In one embodiment, the RFID tagged key may be temporarily retained in a separate location of the key drop box until the Single-Tag RFID reader scans or reads the tagged key. After the tagged key has been scanned, a feedback servomechanism may be configured to actuate, thereby transferring the tagged key to a different storage location within the key drop box. In some embodiments, the separate scanning location may comprise a shelf or actuator arm that articulates to drop its contents when the feedback servomechanism actuates. In another embodiment, the separate storage location may be an initial holding box within the key drop box that is configured to discharge the tagged key due to the actuation of a feedback servomechanism coupled to the initial holding box.

The item return tracking system may also communicate with other systems and databases via a network. For example, the tracking system may send and receive data to/from a rental car company's front office database. Similarly, in some embodiments, processor intensive tasks, such as cataloging data relative to returned items, may be handled by a remote server in communication with the tracking system. The tracking system may also send notification to a customer's device. For example, the tracking system may email a receipt or send a text to inform the customer of a successful return.

As used herein, the phrases "coupled to," "communicatively coupled to," and "in communication with" are broad enough to refer to any suitable coupling or other form of interaction between two or more components, including electrically, mechanical, fluid, and thermal interaction. Two components may be coupled to each other even though there may be intermediary devices between the two components.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, PAL, PLA, PLD, FPGA, or other customized or programmable device. The computer may also include a computer-readable storage device, such as non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment. The network may include communications or networking software, such as software available from Novell, Microsoft, Artisoft, and other vendors, and may operate using UDP, TCP/IP, SPX, IPX, SONET, and other protocols over twisted pair, coaxial, or optical fiber cables; telephone lines; satellites; microwave relays; modulated AC power lines; physical media transfer; wireless radio links; and/or other data transmission "wires." The network may encompass smaller networks and/or be connectable to other networks through a gateway or similar mechanism.

Aspects of certain embodiments of an item return tracking system may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., which perform one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

In the following description, various aspects of the illustrative implementations will be described using terms commonly employed by those skilled in the art to convey the substance of their work to others skilled in the art. However, it will be apparent to those skilled in the art that the disclosure may be practiced with only some of the described aspects. For purposes of explanation, specific configurations are set forth in order to provide a thorough understanding of the illustrative implementations. However, it will be apparent to one skilled in the art that the disclosure may be practiced without the specific details. In other instances, well-known features are omitted or simplified in order not to obscure the illustrative implementations.

Various operations will be described as multiple discrete operations, in turn, in a manner that is most helpful in understanding the disclosure; however, the order of description should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 illustrates a flow chart of a method 100 for processing returned items using an item return tracking system, according to one embodiment. Using the example of after-hour rental car key returns, a key drop box may use the method 100 to track returned keys by scanning or sensing RFID tags coupled to and associated with keys. While the following method steps are described with reference to a key drop box, the steps may be used by any item return tracking system.

The method 100 may comprise a determination 104 as to whether the key drop box is open. The item return tracking system may determine if a door to a secure compartment within the key drop box is open. In some embodiments, a reed switch may be used to determine whether the key drop box is open or closed. A first contact of the reed switch may be coupled to the door of the key drop box and a second contact may be coupled within the key drop box. The position of the reed switch changes based on the proximity of the contacts. If the determination 104 is made that the key drop box is open, the method 100 may send 108 an alert to the offices of the rental car company indicating that the key drop box has been opened. If the key drop box remains open for a threshold period, the system may notify the offices that there is a potential tampering situation.

In some embodiments, if the key drop box door is open for under a threshold amount of time, the alert may simply be logged as an employee who may be collecting keys. If the door remains open beyond the threshold amount of time the alert may be forwarded to an employee to examine the key drop box to ensure it is secure. In other embodiments, the alert may comprise a notification to an employee near the key drop box (e.g., location based alert) or assigned to the key drop box. The employee may respond to the alert to indicate that the door opening is authorized or unauthorized.

The method 100 may also comprise a determination 106 as to whether the key drop box was previously opened. For example, a processing unit of the key drop box may track the state of the door. When the door transitions from an open state to a closed state, the processing unit may be configured to perform a set of operations.

For instance, if the determination 106 is made that the key drop box was previously opened, the method 100 may scan 112 or read the contents of the key drop box to generate a tag count 116. If the tag count 116 returns as null or zero tags, an employee is assumed to have recently emptied the contents of the key drop box and the internal list of returned RFID tags is cleared 120 and the method 100 is repeated. However, if the RFID tag count 116 is not returned as null or zero, a determination 114 is made as to whether a new tag was found. If a new tag was found, the new RFID tag is added 122 to the internal list of returned RFID tags, an update notification is sent 124 to the rental car offices, and the method 100 is repeated. If a new tag was not found, the method 100 is repeated.

If the determination 106 is made that the key drop box has not been previously opened, an interval scan 110 is performed to detect the return of new RFID tags by scanning the entire contents of the key drop box. The interval scan 110 may read every tag in the key drop box periodically. For example, the interval scan 110 may be configured to read the tags every 5-10 seconds. A new tag determination 114 may then be made as to whether a new tag was found by the interval scan 110. If a new tag was found, the new RFID tag is added 122 to the internal list of returned RFID tags, an update notification is sent 124 to the rental car offices, and the method 100 is repeated. If a new tag was not found, the method 100 is repeated.

Figure 2:
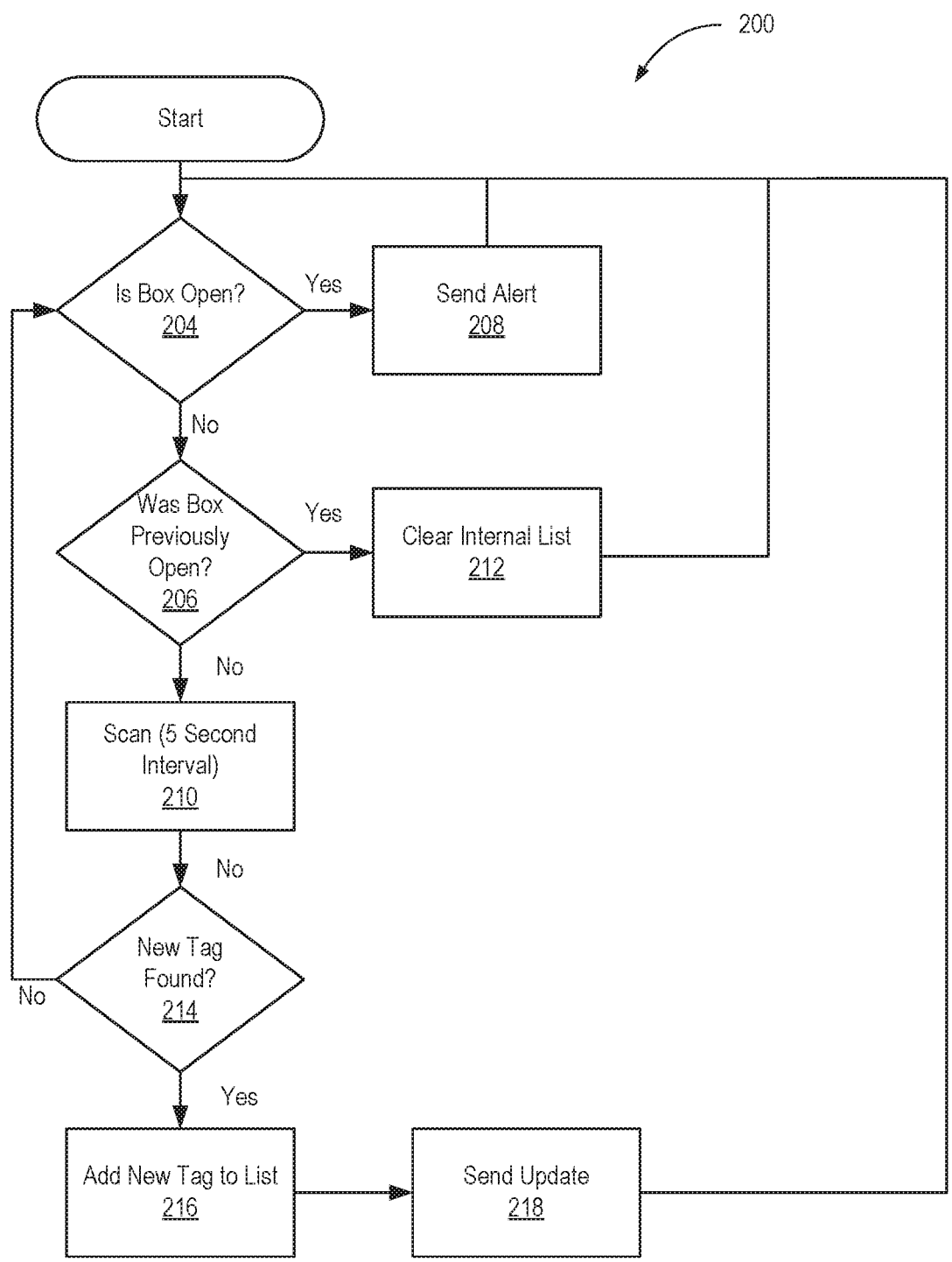
FIG. 2 is a flow chart of a method for processing returned items using an item return tracking system, according to a second embodiment.

FIG. 2 illustrates a flow chart of a method 200 for processing returned items using the item return tracking system, according to a second embodiment. Again, using the example of after-hour rental car key returns, the method 200 may be implemented on a key drop box or compartment for item retainment. The key drop box may be configured to scan or sense a recently returned RFID tag confined within a separate storage location within the key drop box.

The method 200 may comprise a determination 204 as to whether the key drop box is open to prevent tampering. If the determination 204 is made that the key drop box is open, the method 200 may send an alert 208 to offices of the rental car company. In some embodiments, if the key drop box door is open for under a threshold amount of time, the alert may simply be logged as an employee who may be collecting keys. If the door remains open beyond the threshold amount of time the alert may be forwarded to an employee to examine the key drop box to ensure it is secure. In other embodiments, the alert may comprise a notification to an employee near the key drop box (e.g., location based alert) or assigned to the key drop box. The employee may respond to the alert to indicate that the door opening is either authorized or unauthorized.

The method 200 may also comprise a determination 206 as to whether the key drop box was previously opened. If the determination 206 is made that the key drop box was previously opened, the internal list of returned RFID tags is cleared 212 (an employee is assumed to have recently emptied the contents of the key drop box) and the method 200 is repeated.

If the determination 206 is made that the key drop box has not been previously opened, an interval scan 210 is performed to detect the return of new RFID tag within a separate storage location of the key drop box. For example, when tagged keys are placed in the key drop box, they are momentarily trapped until the tag is read. Once the tag is read, the key may be dropped into a main storage area of the key drop box. A new tag determination 214 may then be made as to whether a new tag was found by the interval scan 210. If a new tag was found, the new RFID tag is added 216 to the internal list of returned RFID tags, an update notification is sent 218 to the rental car offices, and the method 200 is repeated. If a new tag was not found, the method 200 is repeated.

Figure 3A:
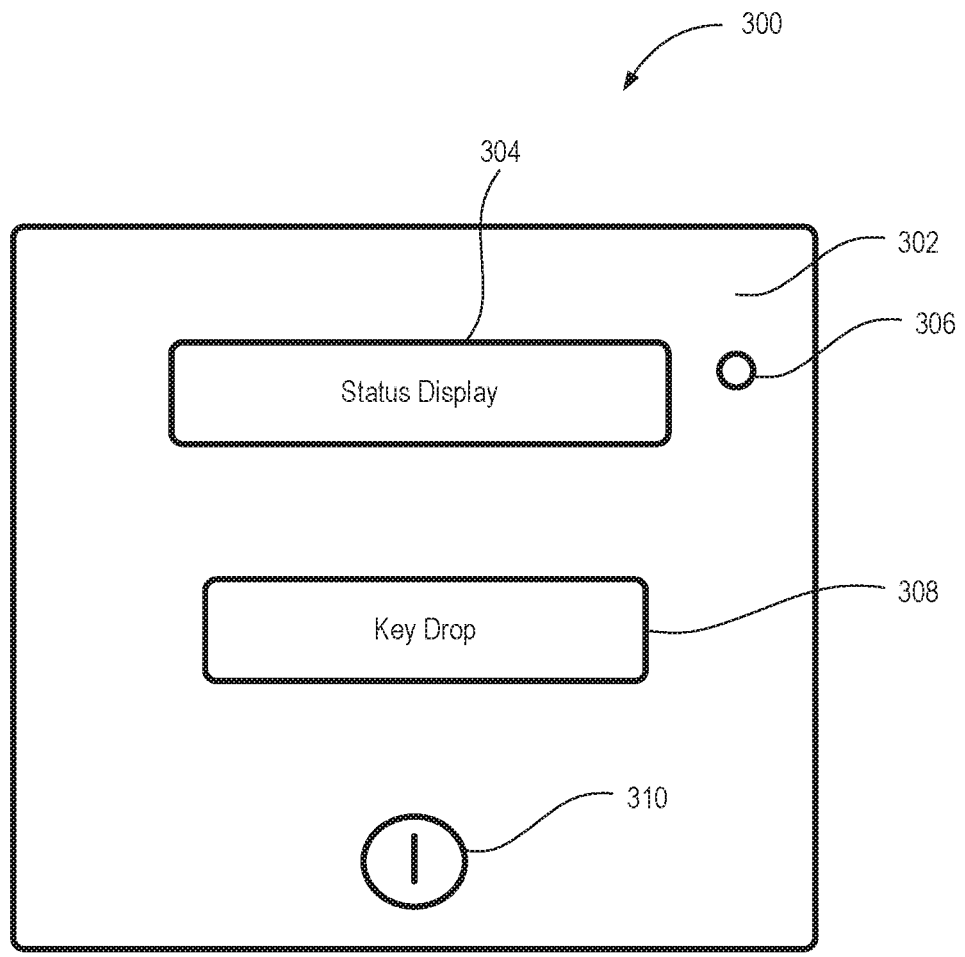
FIG. 3A illustrates the front view of an item return tracking system, according to one embodiment.

FIG. 3A illustrates the front view of an item return tracking system 300, according to one embodiment. The item return tracking system 300 may comprise a container 302, item status identifiers (e.g., status display 304 and status LED 306), an opening 308, and a locking mechanism 310. A lid or a door of the return tracking system 300 may unlock via the locking mechanism 310 to provide access to the items within the container 302. For example, the lid may pivot or detach from the container 302 to facilitate retrieving the returned items stored within the container 302.

The status identifiers may comprise a status display 304 and the status LED 306. The status identifiers may indicate errors, show if the container 302 is empty, and/or indicate connectivity status. The item return tracking system 300 may be connected to external devices through cellular standards, Wi-Fi, Bluetooth, or other communication methods. The status display 304 may provide visual feedback to a user returning a key. For example, the status display 304 may indicate that the item has been successfully returned, or indicate that additional action should be taken.

The opening 308 may be configured to allow entry of an item and prevent retrieval of deposited items. For example, the opening 308 may comprise a slot and an extended ramp that leads to a main storage area. In some embodiments, a sensor may be placed within the opening to detect an item being placed therein. For example, the sensor may detect movement, weight, or a change in light when a key is inserted. The status identifiers may indicate that an item has been dropped by the sensor and also indicate that the tag has been read.

Figure 3B:
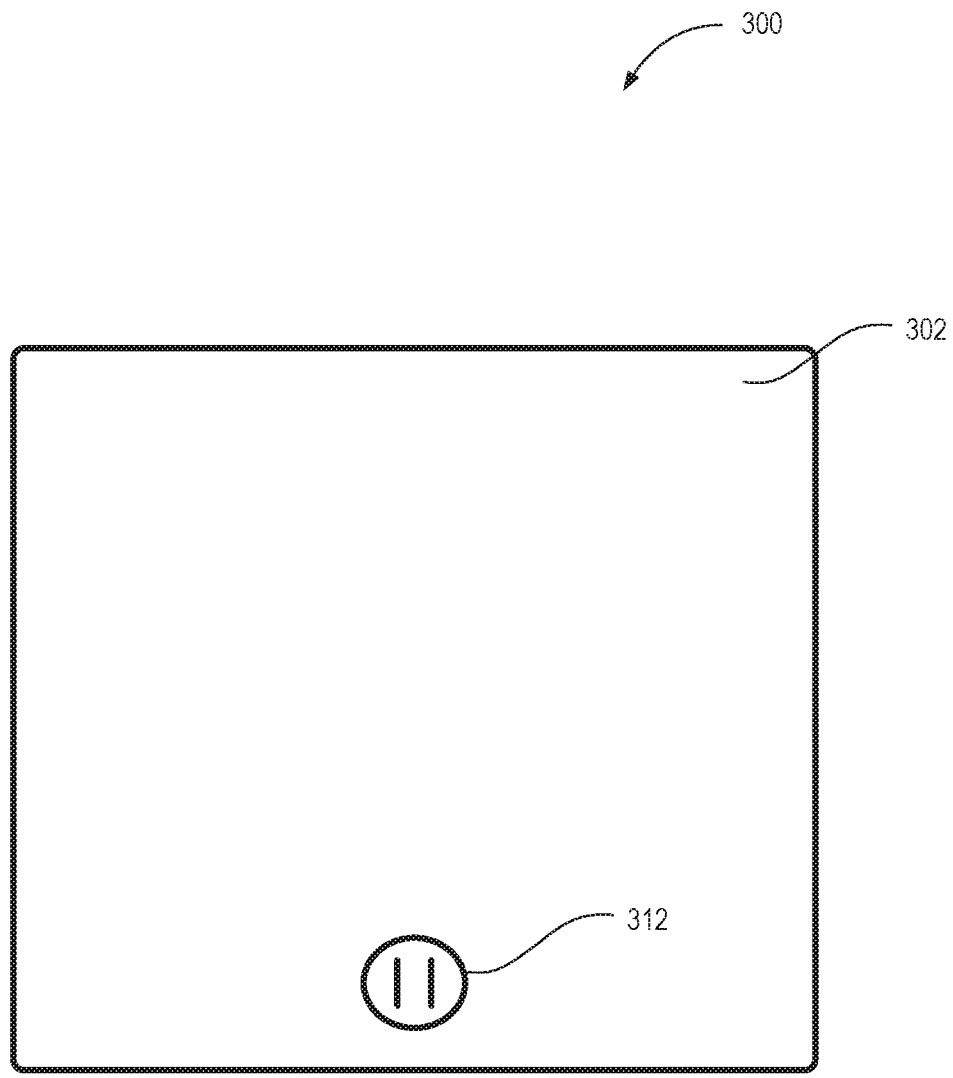
FIG. 3B illustrates the back view of an item return tracking system, according to one embodiment.

FIG. 3B illustrates the back view of an item return tracking system 300 according to one embodiment. The item return tracking system 300 may further comprise a power inlet 312 to provide power. In some embodiments, the return tracking system may be battery or solar powered.

Figure 3C:
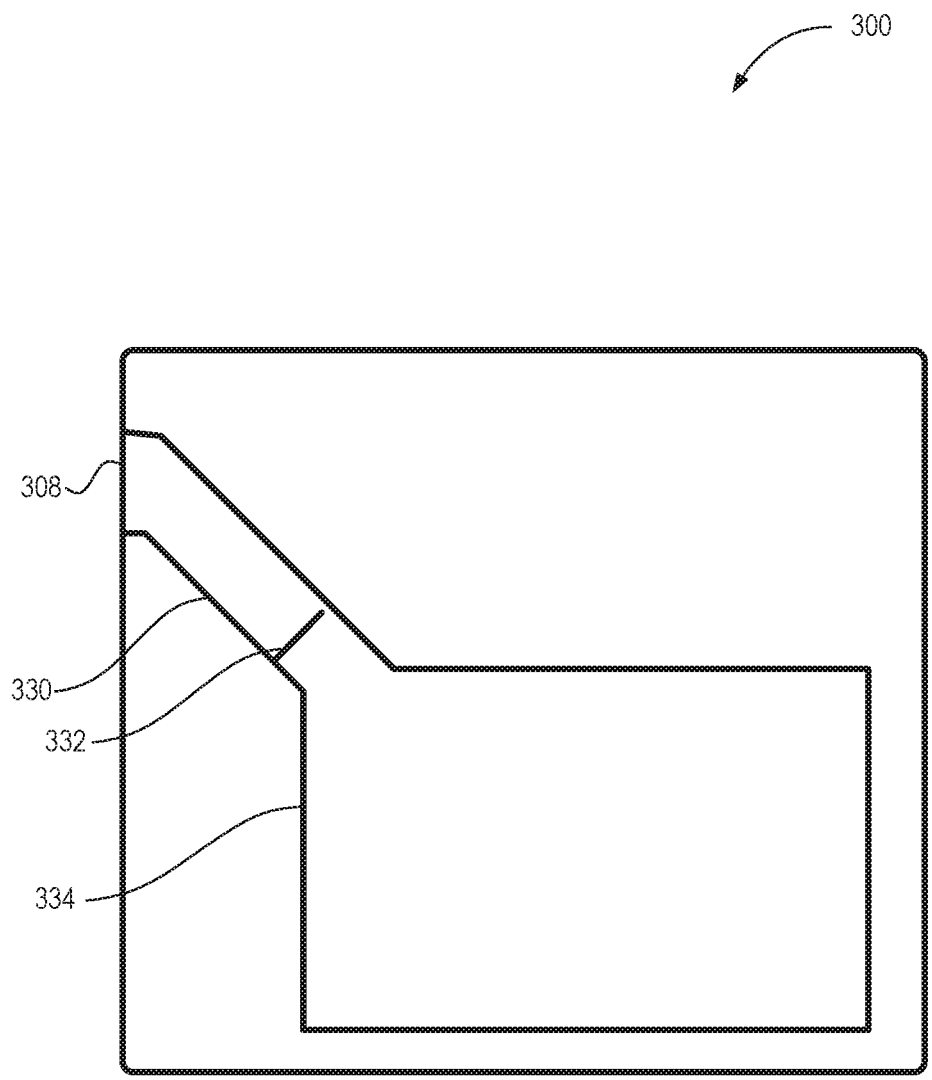
FIG. 3C illustrates a cross-sectional view of a compartment for an item return tracking system, according to one embodiment.

FIG. 3C illustrates a cross-sectional view of item return tracking system 300 according to one embodiment. As shown, the opening 308 may lead to a chute or a ramp 330. A shelf 332 may catch items before the item reaches the main storage area. The shelf 332 may retain the item until a tag associated with the item is read by a reader (not shown) near the shelf 332. The shelf 332 may actuate to allow read items into the main storage area 334. This may allow a single tag reader to read tags individually as the items are placed in the item return tracking system 300. The shelf may be controlled by a servomechanism. For example, a processing unit may receive an identification associated with a tag from the tag reader, produce a timestamp to track when the tag was received, and temporarily change a position of the servomechanism to allow the tag and a key coupled to the tag to enter the main storage compartment. In some embodiments the item may be retained in an initial holding area with an opening controlled by the servomechanism.

In some embodiments, a Multi-Tag RFID reader may read each tag within the main storage area 334. In some embodiments, the Multi-Tag RFID reader may be used to read each item dropped without using the shelf 332.

Figure 4:
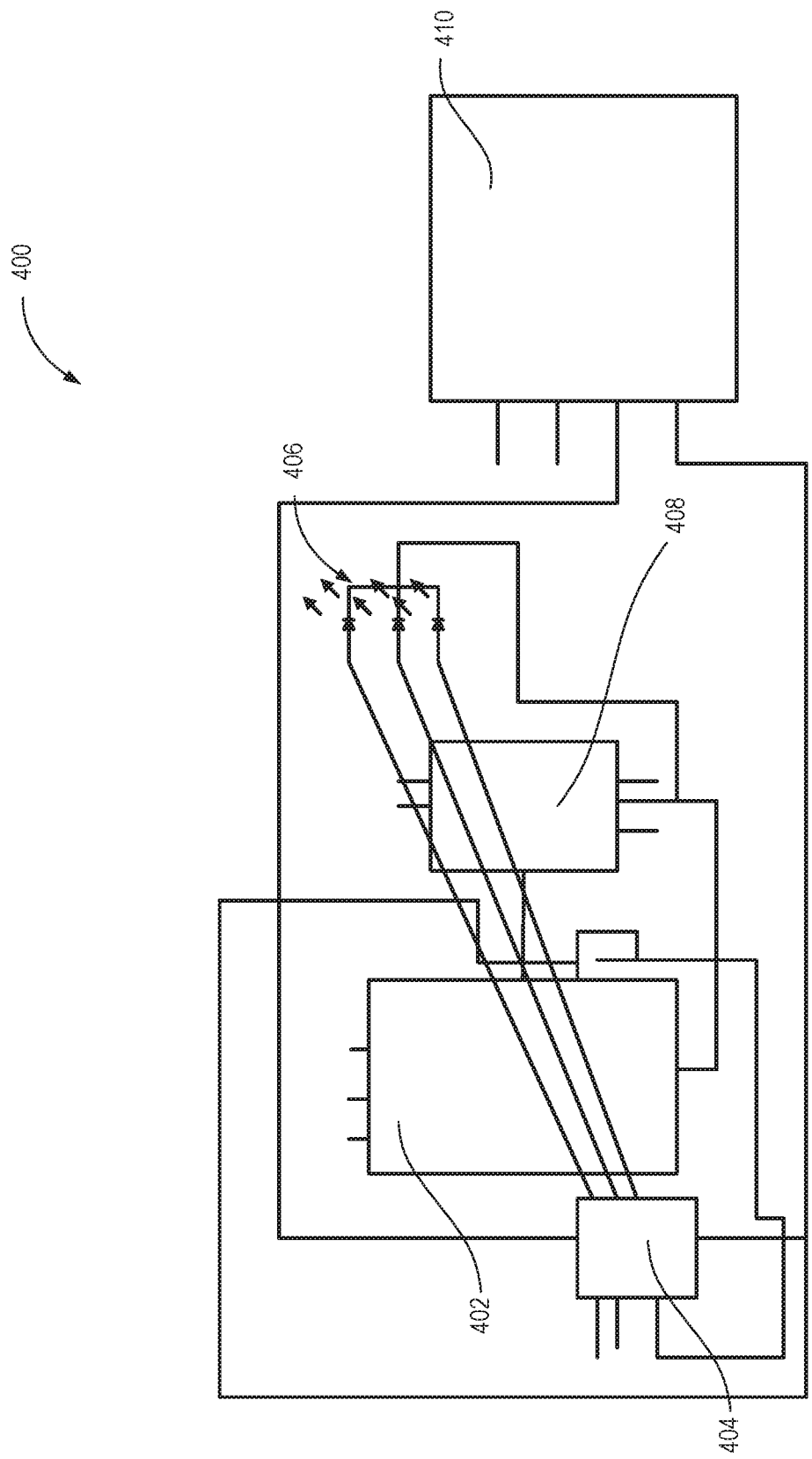
FIG. 4 is a schematic diagram of a return recognition device within an item return tracking system, according to one embodiment.

FIG. 4 is a schematic view of a return recognition device 400 within an item return tracking system, according to one embodiment. The return recognition device 400 may include one or more wireless communication components 402, 404, an RFID reader 408, and status LEDs 406. In some embodiments, as shown, the return recognition device 400 may also include a controller for a servomechanism 410.

The one or more wireless communication components 402, 404 may communicate with other devices. For example, the wireless communication components 402, 404 may include a Bluetooth module, Wi-Fi module, and/or cellular module. The wireless communication components 402, 404 may communicate with a rental return office and the customer returning the item. For instance, the wireless communication components 402, 404 may send a signal to the rental return office indicating a return and send a text message to the customer's phone. When a key is read, the return recognition device 400 may timestamp the event and send the key's information and the timestamp to the rental return office.

The RFID reader 408 may read tags associated with returned keys. In some embodiments, the RFID reader 408 may be configured to read multiple tags at once. These embodiments may or may not use the servomechanism 410. For example, instead of using the servomechanism 410 to stop keys to allow them to be read one at a time, the keys may be allowed to all drop into a main storage compartment.

A Multi-Tag RFID reader may scan all tags within a main storage compartment. In some embodiments, an RFID reader may be configured to read one tag at a time. In these embodiments, the servomechanism 410 may control a key's entry into the main storage compartment to provide a temporary holding position for the key to be read. In some embodiments, a shield may prevent the RFID reader from reading tags external to a storage compartment.

Status LEDs 406 may indicate the status of the key return. For example, the status LEDs 406 may indicate that the return recognition device 400 is ready to receive a key, that a key is being read, that an error has occurred, or that the key return has been processed.

Figure 5:
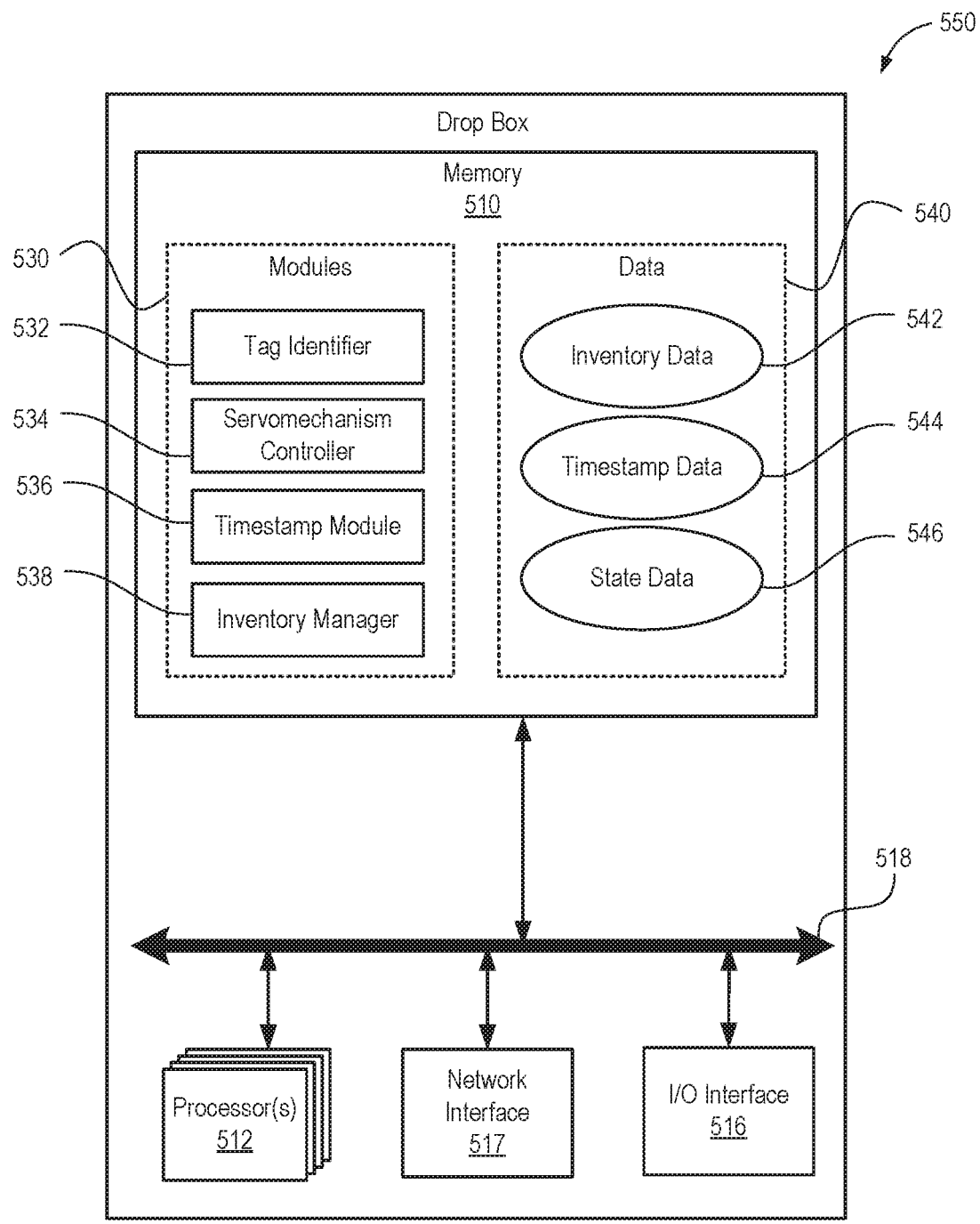
FIG. 5 is a block diagram of a processing circuit of a drop box, according to one embodiment.

FIG. 5 is a block diagram of a processing circuit of a drop box 550, according to one embodiment. The processing circuit of the drop box may be used to implement the method 100 of FIG. 1 or the method 200 of FIG. 2. The drop box 550 may include an electronic memory 510, one or more processors 512, a network interface 517, and an I/O interface 516.

The electronic memory 510 may include static RAM, dynamic RAM, flash memory, one or more flip-flops, or another electronic storage medium. The electronic memory 510 may include a plurality of modules 530 and data 540.

The modules 530 may include all or portions of other elements of the device. The modules 530 may run multiple operations serially, concurrently or in parallel by or on the one or more processors 512.

In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like.

In some embodiments, the modules 530 may include a tag identifier 532, a servomechanism controller 534, a timestamp module 536, and an inventory manager 538. The tag identifier 532 may identify a tag associated with an inventory item with RFID. The servomechanism controller 534 may open and close an opening into a main storage area of the drop box. The timestamp module 536 may produce a timestamp when a tag is identified and associate that timestamp with the identified tag. The inventory manager may generate a list of inventory items that are in the compartment.

The data 540 stored on the electronic memory 510 may include the data 540 generated by the drop box 550, such as by the modules 530 or other modules. The data 540 stored may be organized as one or more memory registers/addresses, files, and/or databases. The data 540 may include inventory data 542 and timestamp data 544. The inventory data 542 may include a list of all items within the drop box 550. The timestamp data 544 may include the times at which each inventory item within the drop box 550 was returned.

In some embodiments, the data 540 may also include state data 546. The state data may track what state the drop box 550 currently is in and what state the drop box 550 was previously in. For example, the state data 546 may be used to determine if the drop box 550 was opened and then closed.

The I/O interface 516 may facilitate interfacing with one or more input devices and/or one or more output devices. For example, the drop box 550 may interface with a user's cell phone, a display device, or status LEDs. The I/O interface 516 may facilitate interaction between the drop box 550 and a user. The network interface 517 may facilitate interaction between the drop box and other devices. For example, the drop box 550 may send the data 540 to a remote server. In some embodiments, the remote server may catalog items across one or more drop boxes.

A system bus 518 may facilitate communication and/or interaction between the other components of the processing circuitry, including the electronic memory 510, the one or more processors 512, the network interface 517, and the I/O interface 516.

As can be appreciated, in other embodiments, the processing circuitry may be simpler than shown or described. For example, certain designs may forgo one or more components, such as memory, multiple processors, multiple interfaces, and the like, and instead execute instructions closer to or on bare metal (e.g., without intervening operating system or other software layer, executing instructions directly on logic hardware).

Figure 6:
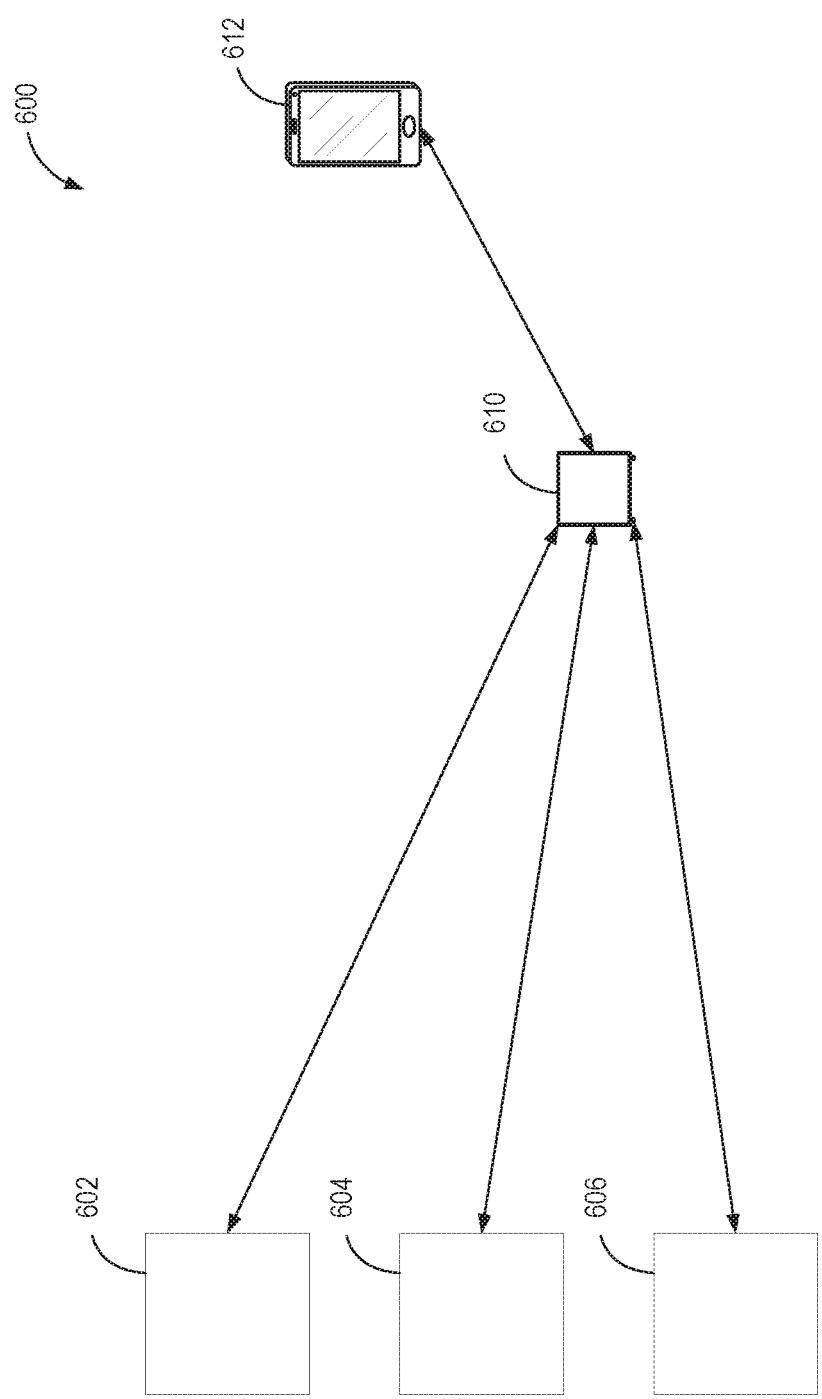
FIG. 6 illustrates an item return tracking system with multiple drop boxes, according to one embodiment.

FIG. 6 illustrates an item return tracking system 600 with multiple drop boxes 602, 604, and 606 according to one embodiment. As shown, the drop boxes 602, 604, and 606 may have an interface with a cataloging server 610. The drop boxes 602, 604, and 606 may store and track items within their respective storage compartments. The drop boxes 602, 604, and 606 may send identifications associated with tags of the items and a timestamp to the cataloging server 610. The cataloging server 610 may track items returned across the drop boxes 602, 604, and 606. Additionally, the drop boxes 602, 604, and 606 may send notification signals concerning the state of the drop box (e.g., open) to the cataloging server 610.

Data concerning the items, e.g., the state of the drop boxes 602, 604, and 606, may be sent to a computing device 612 (e.g., a personal electronic device such as a smart phone or tablet). For example, if the cataloging server 610 receives a notification that a first drop box 602 has been opened, the cataloging server 610 may send a text to the computing device 612 identifying the state of the first drop box 602, thereby alerting an employee that the first drop box 602 has potentially been tampered with.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic and/or processor executable instructions.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure includes all permutations of the independent claims with their dependent claims.

It will be understood by those having skill in the art that many changes may be made to the details of the above-described embodiments without departing from the underlying principles of the invention. The scope of the present invention should, therefore, be determined only by the following claims.

The invention claimed is:

1. A drop box, comprising:
   a compartment for item retention;
   a tag reader to receive an identification of a tag associated with an inventory item inserted into the compartment;
   a transceiver; and
   a processing unit to:
      receive a signal from the tag reader indicating the identification associated with the tag;
      generate a list of inventory items that are in the compartment;
      send a signal, via the transceiver, verifying return of the inventory item;
      detect when the compartment is open;
      send an alert signal, via the transceiver, indicating that the compartment is open; and
      clear the list of inventory items after the compartment has been opened.

2. The drop box of claim 1, further comprising a servomechanism to control an entry into the compartment.

3. The drop box of claim 2, wherein the tag reader identifies the tag associated with the inventory item where the servomechanism controls the entry into the compartment, and
   wherein the processing unit is further to send a signal to the servomechanism to open the entry into the compartment after the tag reader identifies the tag.

4. The drop box of claim 1, wherein the tag reader periodically scans all tags within the compartment, and
   wherein the processing unit is further to identify tags not included in the list.

5. The drop box of claim 1, wherein the tag reader is a radio-frequency identification reader.

6. The drop box of claim 1, further comprising one or more light emitting diodes to indicate that the drop box is ready to receive an inventory item, that a tag is being read, that an error has occurred, or that the inventory item has been processed.

7. An item return tracking system, comprising:
   a plurality of tags, each tag coupled to and associated with an inventory item;
   a drop box comprising:
      a tag reader to identify a tag associated with an inventory item inserted in the drop box;
      a transmitter to send a signal verifying return of the inventory item;
      a processing unit to:
         generate a list of inventory items that are in the drop box;
         receive a signal from the tag reader indicating the tag associated with the inventory item;
         generate a list of inventory items that are in the drop box;
         detect when the drop box is open;
         send an alert signal, via the transmitter, indicating that the drop box is open;
         scan the drop box for tags after the drop box has been opened; and
         clear the list of inventory items if no tags are detected; and
   a server comprising:
      a receiver to receive the signal from the drop box; and
      a processing unit to catalog the inventory item.

8. The item return tracking system of claim 7, wherein the transmitter of the drop box is further to send a notification to a customer indicating the key has been received.

9. The item return tracking system of claim 8, wherein the notification is a text message.

10. The item return tracking system of claim 7, wherein when the tag reader identifies the tag, the drop box generates a timestamp, and
    wherein the signal verifying return of the inventory item comprises an identification of the tag and the timestamp.

11. The item return tracking system of claim 7, wherein tags are coupled to and associated with keys of rental vehicles.

12. A key drop box for rental car returns, the key drop box comprising:
    a main storage compartment;
    a chute coupling an exterior opening of the drop box to an opening in the main storage compartment;
    a servomechanism to selectively open and close the opening in the main storage compartment;
    a tag reader positioned to scan tags coupled to keys before entering the main storage compartment; and
    a processing unit to:
       receive an identification associated with a tag from the tag reader;
       produce a timestamp to track when the tag was received; and
       temporarily change a position of the servomechanism to allow the tag and a key coupled to the tag to enter the main storage compartment.

13. The key drop box of claim 12, wherein the servomechanism retains the tag and the key in the chute until the tag is scanned.

14. The key drop box of claim 12, further comprising an initial holding compartment coupling the chute and the main storage compartment, wherein the servomechanism retains the tag and the key in the initial holding compartment until the tag is scanned.

15. The key drop box of claim 12, further comprising a sensor to detect when items enter the chute, wherein the processing unit is further to receive a signal indicating that an item has entered the chute and send a signal to the tag reader to scan for a tag.

16. The key drop box of claim 12, wherein the tag reader periodically scans for tags.

17. The key drop box of claim 12, further comprising a shield to prevent the tag reader from scanning tags outside the key drop box.

* * * * *